(12) United States Patent
Ishii et al.

(10) Patent No.: US 7,631,339 B2
(45) Date of Patent: Dec. 8, 2009

(54) METHOD FOR CORRECTING CLOCK FREQUENCY, RECEIVING APPARATUS, REPRODUCING APPARATUS, AND PROGRAM

(75) Inventors: Masahiro Ishii, Nishinomiya (JP); Tomohiko Kitamura, Hirakata (JP)

(73) Assignee: Panasonic Corporation, Osaka (JP)

( * ) Notice: Subject to any disclaimer, the term of this patent is extended or adjusted under 35 U.S.C. 154(b) by 1456 days.

(21) Appl. No.: 10/293,650

(22) Filed: Nov. 13, 2002

(65) Prior Publication Data

US 2003/0091328 A1    May 15, 2003

(30) Foreign Application Priority Data

Nov. 14, 2001    (JP) .............................. 2001-348410

(51) Int. Cl.
    *H04N 7/16*    (2006.01)
(52) U.S. Cl. ........................... 725/151; 386/40; 386/46; 386/113; 370/503; 370/516; 370/517; 370/519; 375/354; 375/240.28
(58) Field of Classification Search .................. 386/40, 386/46, 85, 113; 375/145, 240.28, 354
    See application file for complete search history.

(56) References Cited

U.S. PATENT DOCUMENTS

| | | | |
|---|---|---|---|
| 5,898,680 A * | 4/1999 | Johnstone et al. ........... 370/316 |
| 5,990,967 A | 11/1999 | Kawakami et al. |
| 6,005,872 A | 12/1999 | Bassi et al. |
| 6,148,051 A | 11/2000 | Fujimori et al. |
| 6,151,479 A * | 11/2000 | Kummer ...................... 725/70 |
| 6,661,811 B1 * | 12/2003 | Baker .......................... 370/516 |
| 2002/0027886 A1 * | 3/2002 | Fischer et al. ............... 370/255 |
| 2003/0206605 A1 * | 11/2003 | Anderson .................... 375/355 |

FOREIGN PATENT DOCUMENTS

| | | |
|---|---|---|
| EP | 0 735 776 | 10/1996 |
| EP | 0 749 244 | 12/1996 |
| EP | 0 853 434 | 7/1998 |
| JP | 8-190515 | 7/1996 |
| KR | 10-0311173 | 12/2001 |

* cited by examiner

*Primary Examiner*—John W Miller
*Assistant Examiner*—Sumaiya A Chowdhury

(57) ABSTRACT

An object of the present invention is to provide methods for properly correcting a frequency of a standard clock, receiving apparatuses, reproducing apparatuses, and programs in broadcasting data receiving systems comprising a receiving apparatus and a reproducing apparatus, in which the broadcasting data received at the receiving apparatus is transmitted to a reproducing apparatus via bus.

In the broadcasting data receiving systems stated above, when the receiving apparatus detects the broadcasting-side time information that reflects the encoding standard clock, the extraction of the broadcasting-side time information is transmitted in a form of status change signal to the reproducing apparatus via the dedicated line, and the content of the broadcasting-side time information is transmitted to the reproducing apparatus via bus. By this, the timing of the extraction of the broadcasting-side time information is immediately notified to a reproducing apparatus, and the correction of the decoding standard clock is properly carried out.

20 Claims, 11 Drawing Sheets

METHOD FOR CORRECTING CLOCK FREQUENCY, RECEIVING APPARATUS, REPRODUCING APPARATUS, AND PROGRAM

BACKGROUND OF THE INVENTION (1) Field of the Invention

The present invention relates to the system for receiving and reproducing digital broadcasting. More specifically, it relates to methods for correcting clock frequency, receiving apparatuses, reproducing apparatuses, and programs.

(2) Description of the Related Art

Digital broadcasting has been rapidly growing as can be seen in commencement of the CS digital broadcasting and the BS digital broadcasting. The digital broadcasting is realized by such systems that comprise a broadcasting apparatus and a receiving/reproducing apparatus. The broadcasting apparatus generates a plurality of pieces of broadcasting data by encoding digital content such as videos and sounds, and then transmits the pieces of broadcasting data in an order. The receiving/reproducing apparatus receives and decodes the broadcasting data, and then reproduces the content.

The broadcasting apparatus and the receiving/reproducing apparatus each contain a standard clock. By clocking based on the standard clock, time for the broadcasting apparatus (hereinafter referred to as "broadcasting-side time") and time for the receiving/reproducing apparatus (hereinafter referred to as "reproducing-side time") are generated and possessed respectively. In the MPEG-2 standard, content is transmitted with attached information called a timestamp, indicating the time to reproduce the content. When encoding the content, the broadcasting apparatus attaches the timestamp to the content by referring to the broadcasting-side time. The receiving/reproducing apparatus reproduces the content when the attached timestamp and the reproducing-side time are identical.

However, since the standard clock contained in the receiving/reproducing apparatus is independent of the standard clock of the broadcasting apparatus, a discrepancy between the broadcasting-side time and the reproducing-side time occurs, in the cases where there is an error between the standard clock frequency of each apparatus. Such a discrepancy in the time could grow larger, if left uncorrected, to an extent that the content cannot be reproduced properly.

In order to correct the discrepancy, a standard clock correcting mechanism for correcting the standard clock of the receiving/reproducing apparatus is provided. In this mechanism, the broadcasting apparatus broadcasts broadcasting-side time information, which is an encoded broadcasting-side time, contained in at least one of the pieces of broadcasting data in addition to the content such as videos and sounds; the receiving/reproducing apparatus calculates the error between each standard clock frequency, based on the broadcasting-side time information contained in the received broadcasting data, and corrects the standard clock frequency of the receiving/reproducing apparatus. By such a standard clock correcting mechanism, the broadcasting-side time and the reproducing-side time can be set approximately same, and the reproduction of the content can be carried out properly. In the following paragraphs, the standard clock correcting mechanism is explained in reference to FIG. 1.

FIG. 1 shows a construction of a conventional receiving/reproducing apparatus.

First, the broadcasting data passes through a time information extracting unit 601 in a receiving/reproducing apparatus 606. If the broadcasting data contains the broadcasting-side time information, the time information extracting unit 601 transmits the broadcasting-side time information to broadcasting-side time information holding unit 602, and notifies a time information managing unit 603 that the time information is received by a signal indicating the reception. In response to the signal sent from the time information extracting unit 601, the time information managing unit 603 reads out receiving/reproducing-side time information at the time when the broadcasting-side time information is received from a receiving/reproducing-side time information holding unit 604. The time information managing unit 603 compares the broadcasting-side time information and the receiving/reproducing-side time information, calculates the difference between each standard clock frequency, and then notifies a variable frequency generating unit 605 an amount of correction. The variable frequency generating unit 605 corrects the frequency according to the notified amount of correction.

In recent years, portable terminals such as mobile phones and personal digital assistances (PDAs) have become explosively widespread, as higher performance and more reduction in both weight and price of such portable terminals have been realized with gathering pace. With the popularization of the digital broadcasting in the future, it is expected that such portable terminals will be provided with functions to receive digital broadcasting. In order to receive digital broadcasting with such portable terminals, such a system explained below is considered to be highly possible. In the system, an expansion card which is a small storage device such as secure digital memory cards and memory sticks provided with broadcast receiving functions is used as a receiving apparatus; a portable terminal is used as a reproducing apparatus. By connecting the expansion card and the portable terminal, a system to receive digital broadcasting with portable terminals can be realized.

Such small storage devices and the portable terminals are usually connected via bus. Therefore, it is desirable that the broadcasting data received through the receiving apparatus is transmitted to the reproducing apparatus via bus.

In the case of transmission via bus, however, the transmission of the broadcasting data becomes on hold if bus is occupied, while, when bus is idle, it can be transmitted to the reproducing apparatus immediately after the broadcasting data is received. This indicates that the length of the time for transmitting the broadcasting-side time information from the receiving apparatus to the reproducing apparatus is uncertain. In order to correct the standard clock frequency based on the broadcasting-side time information, not only a content of the broadcasting-side time information, but also information about timing of the reception of the broadcasting-side time information is necessary, and thus correction of the standard clock frequency cannot be carried out properly in the cases in which bus are used for transmission.

SUMMARY OF THE INVENTION

The present invention is made in view of the above circumstance. An object of the present invention is to provide methods, apparatuses, and programs for enabling the proper correction of the standard clock frequency, even in the cases in which the transmission of the broadcasting data between the receiving apparatuses and reproducing apparatuses is carried out via bus.

The methods for correcting clock frequency according to the present invention is a method for correcting a frequency used in a system including a broadcasting apparatus, a receiving apparatus and a reproducing apparatus, the broadcasting apparatus generating a plurality of pieces of broadcasting data by encoding content based on an encoding standard clock, and broadcasting the plurality of the pieces of broadcasting data, the receiving apparatus receiving the plurality of the pieces of broadcasting data in an order via a first path, and the reproducing apparatus decoding the plurality of the pieces of broadcasting data based on a decoding standard clock, and for reproducing the content, the method comprising a time information broadcasting step for broadcasting broadcasting-side time information, the broadcasting-side time information indicating broadcasting-side time based on the encoding standard clock and being contained at least one of the pieces of broadcasting data; a judging step for judging whether the broadcasting-side time information is contained in the broadcasting data received by the receiving apparatus; a transmitting step for transmitting timing information to the reproducing apparatus via a second path when a result in the judging step is affirmative, the timing information indicating timing that the affirmative result was returned in the judging step; and a correcting step for correcting, by using the broadcasting-side time information and reproducing-side time information, a frequency of the decoding standard clock to be closer to a frequency of the encoding standard clock, the broadcasting-side time information being received via the first path, the reproducing-side time information indicating reproducing-side time measured in accordance with the decoding standard clock when the timing information is received in the reproducing apparatus.

As shown in the above, the timing that the receiving apparatus receives the broadcasting-side time information is transmitted to the reproducing apparatus via the second path. Therefore the broadcasting-side time information can be transmitted always in substantially constant length of time regardless of the traffic on the first path.

Accordingly, it is possible to properly correct the frequency of the decoding standard clock in the reproducing apparatus so as to set the frequency of the decoding standard clock to be closer to the frequency of the encoding standard clock.

In addition, the transmitting step includes a first transmitting substep for transmitting, immediately after judgment was made whether the broadcasting-side time information was contained, a status change signal to the reproducing apparatus via the second path, the status change signal indicating at least one of a plurality of status changes occurred in the receiving apparatus, one of the plurality of status changes being a status that the broadcasting-side time information is contained in the broadcasting data; and a second transmitting substep for transmitting information about a type of status change that occurred in the receiving apparatus to the reproducing apparatus via the first path upon the transmission of the status change signal in the first transmitting substep, wherein, the correcting step is the step in which the frequency of the decoding standard clock is corrected, only when the information about the status change indicates that the broadcasting-side time information was contained in the broadcasting data.

As shown in the above, the timing that the receiving apparatus receives the broadcasting-side time information is transmitted to the reproduction apparatus by using the status change signals. The status change signal is for transmitting a notification to the reproduction apparatus if the status change occurs in the receiving apparatus.

Therefore, the other status changes in the receiving apparatus can also be transmitted to the reproducing apparatus, in addition to the timing that the receiving apparatus receives the broadcasting-side time information.

The receiving apparatus according to the present invention is a receiving apparatus for receiving a plurality of pieces of broadcasting data from a broadcasting apparatus, and transmitting the pieces of broadcasting data received in an order to a reproducing apparatus, the pieces of broadcasting data being generated by encoding content based on an encoding standard clock, the reproducing apparatus decoding the received broadcasting data based on a decoding standard clock and reproducing the content, the receiving apparatus comprising a judging unit operable to judge whether the received broadcasting data contains broadcasting-side time information, the broadcasting-side time information indicating broadcasting-side time based on the encoding standard clock, the broadcasting-side time information being contained in at least one of the pieces of broadcasting data and broadcasted by the broadcasting apparatus; and a transmitting unit operable to transmit timing information to the reproducing apparatus via a second path when the judging unit judged affirmative, the timing information indicating timing that the judging unit judged affirmative, the reproducing apparatus correcting the frequency based on the timing information.

As shown in the above, the timing that the receiving apparatus receives the broadcasting-side time information is transmitted to the reproducing apparatus via the second path. Therefore the broadcasting-side time information can be transmitted always in substantially constant length of time regardless of the traffic on the first path.

Accordingly, it is possible to properly correct the frequency of the decoding standard clock in the reproducing apparatus so as to set the frequency of the decoding standard clock to be closer to the frequency of the encoding standard clock.

In addition, the transmitting unit comprises a first transmitting unit operable to transmit immediately after the judging unit judged affirmative, a status change signal to the reproducing apparatus via the second path, the status change signal indicating at least one of a plurality of status changes occurred in the receiving apparatus, one of the plurality of status changes being a status that the broadcasting-side time information is contained in the broadcasting data, and a second transmitting unit operable to transmit information about a type of status change that occurred in the receiving apparatus to the reproducing apparatus via the first path.

As shown in the above, the timing that the receiving apparatus receives the broadcasting-side time information is transmitted to the reproduction apparatus by using the status change signals. The status change signal is for transmitting a notification to the reproduction apparatus if the status change occurs in the receiving apparatus.

Therefore, the other status changes in the receiving apparatus can also be transmitted to the reproducing apparatus, in addition to the timing that the receiving apparatus receives the broadcasting-side time information.

In addition, the transmitting unit transmits first timing information and second timing information to the reproducing apparatus via the second path, the first timing information indicating timing that the judging unit judged affirmative, and the second timing information indicating timing that the judging unit judged that second broadcasting-side time information was contained in the broadcasting data; and wherein the receiving apparatus further comprises a time difference transmitting unit operable to transmit time difference information, instead of the broadcasting-side time information, to the reproducing apparatus via the first path, the time difference information showing the difference between the first and the second broadcasting-side time information, and the reproducing apparatus correcting the frequency based on the time difference information.

As shown in the above, the receiving apparatus transmits the time difference information, indicating the difference between the first and the second broadcasting-side time information, to the reproducing apparatus. Accordingly, it is possible to reduce the size of data transmitted from the receiving apparatus to the reproducing apparatus via the first path.

In addition, the transmitting unit further comprises a threshold value holding unit operable to hold a predetermined threshold value; wherein the transmitting unit transmits, immediately after the judging unit judged affirmative, the timing information to the reproducing apparatus via the second path only if time difference information exceeds the predetermined threshold value, the time difference information being the difference between the first and the second broadcasting-side time information.

As shown in the above, the receiving apparatus transmits the status change signal to the reproducing apparatus only when the time difference information exceeds the predetermined threshold value held by the threshold value holding unit. Accordingly, it is possible to reduce the number of data transmission that relates to the correction of the standard clock unit.

The reproducing apparatus according to the present invention is a reproducing apparatus for receiving a plurality of pieces of broadcasting data from a receiving apparatus via a first path, for decoding the pieces of broadcasting data based on a decoding standard clock, and for reproducing content, the pieces of broadcasting data being generated by encoding the content based on an encoding standard clock and received by the receiving apparatus in an order; the reproducing apparatus comprising an obtaining unit operable to obtain timing information via a second path if the receiving apparatus judged the broadcasting data contained broadcasting-side time information, the timing information indicating timing that the receiving apparatus judged affirmative, at least one of the pieces of broadcasting data being broadcasted containing the broadcasting-side time information, and the broadcasting-side time information indicating broadcasting-side time based on the encoding standard clock; and a correcting unit operable to correct, by using the broadcasting-side time information and reproducing-side time information, a frequency of the decoding standard clock to be closer to a frequency of the encoding standard clock, the broadcasting-side time information being received via the first path, the reproducing-side time information indicating reproducing-side time measured in accordance with the decoding standard clock when the timing information is received in the reproducing apparatus.

As shown in the above, the timing that the receiving apparatus receives the broadcasting-side time information is transmitted to the reproducing apparatus via the second path. Therefore the broadcasting-side time information can be transmitted always in substantially constant length of time regardless of the traffic on the first path.

Accordingly, it is possible to properly correct the frequency of the decoding standard clock in the reproducing apparatus so as to set the frequency of the decoding standard clock to be closer to the frequency of the encoding standard clock.

In addition, the obtaining unit comprises a detecting unit operable to detect a status change signal, the status change signal indicating at least one of a plurality of status changes occurred in the receiving apparatus, one of the plurality of status changes being a status that the broadcasting-side time information is contained in the broadcasting data; and a confirming unit operable to confirm a type of status change occurred in the receiving apparatus when the status change signal was detected by the detecting unit; wherein the correcting unit corrects the frequency of the decoding standard clock, only when the confirming unit confirmed that the status change signal indicated that the broadcasting-side time information was contained in the broadcasting data.

As shown in the above, the timing that the receiving apparatus receives the broadcasting-side time information is transmitted to the reproduction apparatus by using the status change signals. The status change signal is for transmitting a notification to the reproduction apparatus if the status change occurs in the receiving apparatus.

Therefore, the other status changes in the receiving apparatus can also be transmitted to the reproducing apparatus, in addition to the timing that the receiving apparatus receives the broadcasting-side time information.

In addition, the obtaining unit obtains first timing information and second timing information, the first timing information indicating timing that the receiving apparatus judged that first broadcasting-side time information was contained in the broadcasting data, and the second timing information indicating timing that the receiving apparatus judged that second broadcasting-side time information was contained in the broadcasting data; and wherein the correcting unit receives time difference information instead of the broadcasting-side time information, and corrects the frequency of the decoding standard clock using the first and the second timing information and the time difference information, the time difference information being the difference between the first and the second broadcasting-side time information received by the receiving apparatus.

As shown in the above, the reproducing apparatus uses the time difference information, indicating the difference between the first and the second broadcasting-side time information, as the information relates to the correction of the decoding standard clock. Accordingly, it is possible to reduce the size of data transmitted from the receiving apparatus to the reproducing apparatus via the first path.

The program according to the present invention is a program for enabling a computer to execute an operation in which a reproducing apparatus receives a plurality of pieces of broadcasting data from a receiving apparatus via a first path, decodes the pieces of broadcasting data based on a decoding standard clock, and reproduces content, the pieces of broadcasting data being generated by encoding the content based on an encoding standard clock and received by the receiving apparatus in an order; the program comprising an obtaining step for obtaining timing information via a second path if the receiving apparatus judged the broadcasting data contained broadcasting-side time information, the timing information indicating timing that the receiving apparatus judged affirmative, at least one of the pieces of broadcasting data being broadcasted containing the broadcasting-side time information, and the broadcasting-side time information indicating broadcasting-side time based on the encoding standard clock; and a correcting step for correcting, by using the broadcasting-side time information and reproducing-side time information, a frequency of the decoding standard clock to be closer to a frequency of the encoding standard clock, the broadcasting-side time information being received via the first path, the reproducing-side time information indicating reproducing-side time measured in accordance with the decoding standard clock when the timing information is received in the reproducing apparatus.

As shown in the above, the timing that the receiving apparatus receives the broadcasting-side time information is transmitted to the reproducing apparatus via the second path. Therefore the broadcasting-side time information can be transmitted always in substantially constant length of time regardless of the traffic on the first path.

Accordingly, it is possible to properly correct the frequency of the decoding standard clock in the reproducing apparatus so as to set the frequency of the decoding standard clock to be closer to the frequency of the encoding standard clock.

In addition, the obtaining step comprises a detecting substep for detecting a status change signal, the status change signal indicating at least one of a plurality of status changes occurred in the receiving apparatus, one of the plurality of status changes being a status that the broadcasting-side time information is contained in the broadcasting data; and a confirming substep for confirming a type of status change occurred in the receiving apparatus when the status change signal is detected in the detecting substep; wherein the correcting step for correcting the frequency of the decoding standard clock, only when the status change signal indicates that confirmation is made in the confirming substep that the broadcasting-side time information was contained in the broadcasting data.

As shown in the above, the timing that the receiving apparatus receives the broadcasting-side time information is transmitted to the reproduction apparatus by using the status change signals. The status change signal is for transmitting a notification to the reproduction apparatus if the status change occurs in the receiving apparatus.

Therefore, the other status changes in the receiving apparatus can also be transmitted to the reproducing apparatus, in addition to the timing that the receiving apparatus receives the broadcasting-side time information.

In addition, in the obtaining step, first timing information and second timing information are obtained, the first timing information indicating timing that the receiving apparatus judged that first broadcasting-side time information was contained in the broadcasting data, and the second timing information indicating timing that the receiving apparatus judged that second broadcasting-side time information was contained in the broadcasting data; and in the correcting step, time difference information instead of the broadcasting-side time information is transmitted, and the frequency of the decoding standard clock is corrected using the first and the second timing information and the time difference information, the time difference information being the difference between the first and the second broadcasting-side time information received by the receiving apparatus.

As shown in the above, the reproducing apparatus use the broadcasting-side time difference information, indicating the difference between the first and the second broadcasting-side time information, as the information relates to the correction of the decoding standard clock. Accordingly, it is possible to reduce the size of data transmitted from the receiving apparatus to the reproducing apparatus via the first path.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

First Embodiment

[Outline]

In the first embodiment of the present invention, a receiving apparatus and a reproducing apparatus are separated, and broadcasting data received by the receiving apparatus are transmitted to the reproducing apparatus via bus. The first embodiment explains a technology for correcting a frequency of a decoding standard clock to be closer to a frequency of an encoding standard clock of a broadcasting apparatus in such a system stated above. In order to correct the standard clock, not only the content of broadcasting-side time information, but also information about timing that the receiving apparatus receives the broadcasting-side time information is necessary. Therefore, the content of the broadcasting-side time information received at the receiving apparatus is transmitted to the reproducing apparatus via bus, and the timing that the broadcasting-side time information is received is transmitted as a status change signal to the reproducing apparatus via a dedicated line.

[Construction]

Figure 1:
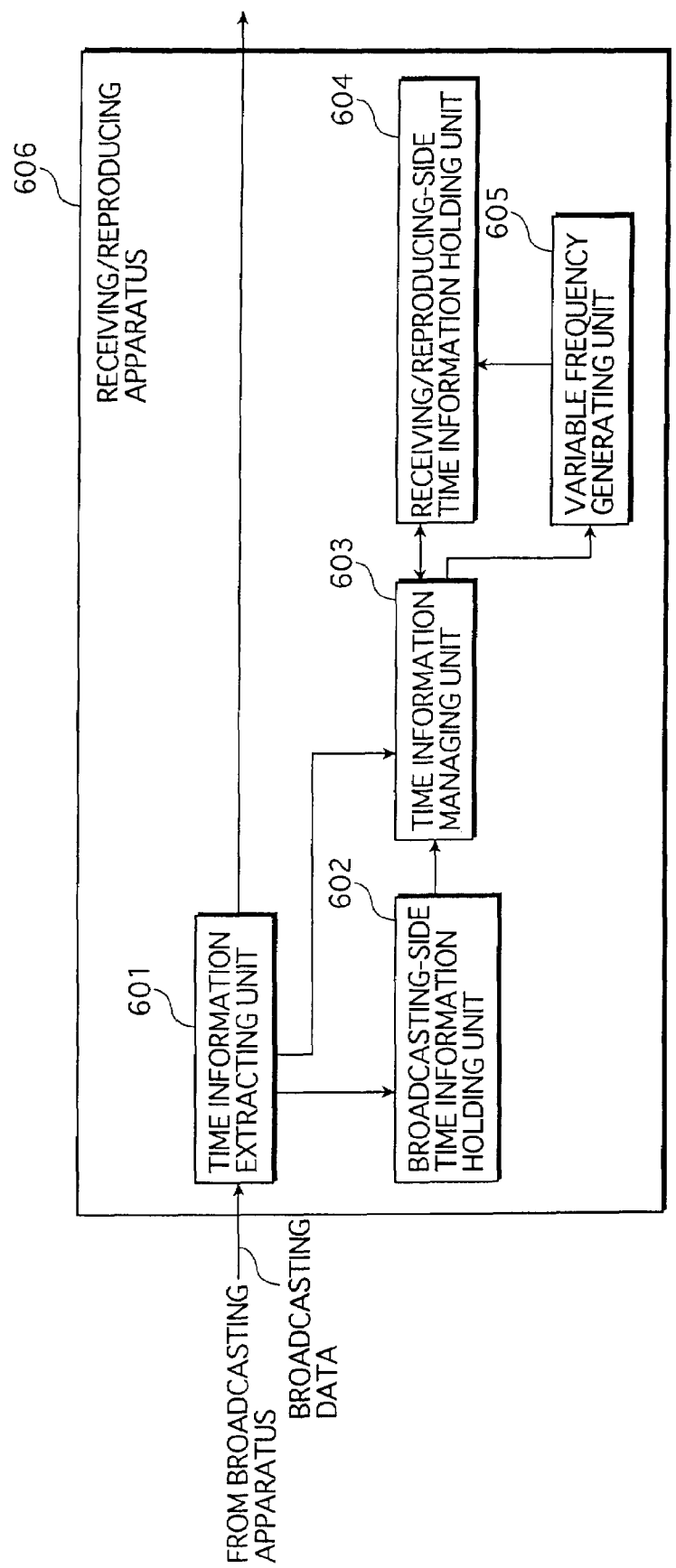
FIG. 1 shows a construction of a conventional receiving/reproducing apparatus.
Figure 2:
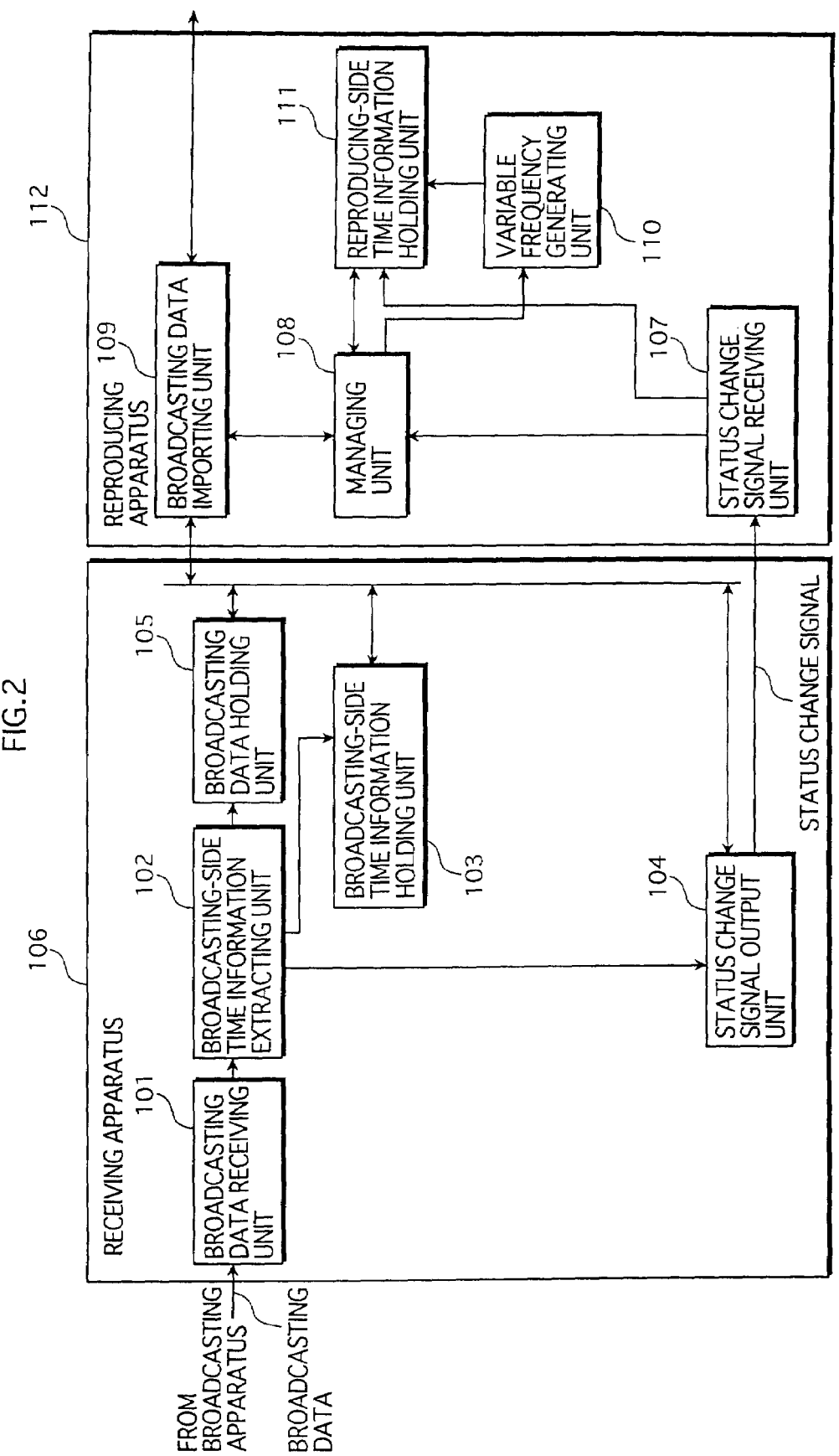
FIG. 2 shows a construction of a receiving apparatus and a reproducing apparatus according to the first embodiment of the present invention.

FIG. 2 shows a construction of a receiving apparatus 106 and a reproducing apparatus 112 according to the first embodiment of the present invention.

The broadcasting apparatus broadcasts a plurality of pieces of broadcasting data that are encoded digital content, such as videos and sounds, based on an encoding standard clock of a broadcasting apparatus. At least one of the pieces of broadcasting data contains broadcasting-side time information indicating broadcasting-side time clocked by the encoding standard clock.

The receiving apparatus 106 comprises a broadcasting data receiving unit 101, a broadcasting-side time information extracting unit 102, a broadcasting-side time information holding unit 103, a status change signal output unit 104, and a broadcasting data holding unit 105. The receiving apparatus 106 receives and holds the broadcasting data in an order. The data held by the broadcasting data holding unit 105 is outputted according to the request from the reproducing apparatus 112.

The reproducing apparatus 112 receives the broadcasting data received by the receiving apparatus 106, and reproduces the content. The reproducing apparatus 112 comprises a status change signal receiving unit 107, a managing unit 108, a broadcasting data importing unit 109, a variable frequency generating unit 110, and a reproducing-side time information holding unit 111.

The broadcasting data is received by the broadcasting data receiving unit 101. Then, the broadcasting data passes through the broadcasting-side time information extracting unit 102, and is transmitted to and held by the broadcasting data holding unit 105.

The broadcasting-side time information extracting unit 102 judges whether the broadcasting-side time information is contained in the received broadcasting data. If the broadcasting-side time information is contained, the broadcasting-side time information extracting unit 102 extracts the broadcasting-side time information, then transmits the broadcasting-side time information to the broadcasting-side time information holding unit 103, and further notifies the status change signal output unit 104 that the time information is received.

The broadcasting-side time information holding unit 103 holds the broadcasting-side time information transmitted from the broadcasting-side time information extracting unit 102.

The status change signal output unit 104 outputs a status change signal to the status change signal receiving unit 107 in response to the reception of the broadcasting-side time information at the broadcasting-side time information extracting unit 102. The status change signal receiving unit 107 is provided to the reproducing apparatus 112. Because the status change signal output unit 104 and the status change signal receiving unit 107 for receiving the status change signal are connected via the dedicated line, the status change signal can be transmitted always in substantially constant length of time regardless of the traffic on the bus. In addition, the status change signal is outputted, not only when the broadcasting-side time information is received, but also when other kind of status change occurs. Therefore, the status change signal output unit 104 is made such that it is possible to inquire the status change signal output unit 104 after the transmission, about what kind of status change, that had the status change signal output unit 104 output the status change signal, occurred in the receiving apparatus 106.

When the status change signal receiving unit 107 receives the status change signal, the status change signal receiving unit 107 notifies the managing unit 108 and the reproducing-side time information holding unit 111 that the status change signal receiving unit 107 receives the status change signal from the status change signal output unit 104. Upon the notification, the reproducing-side time information holding unit 111 holds the reproducing-side time information which indicates the time of the receiving apparatus 112. In such a way, the timing that the receiving apparatus 106 receives the broadcasting-side time information is transmitted to and held by the reproducing apparatus 112.

Upon the notification from the status change signal receiving unit 107, the managing unit 108 makes an inquiry to the status change signal output unit 104 via bus and the broadcasting data importing unit 109, about what kind of status change occurred in the receiving apparatus 106. If the result indicates that the status change indicates the reception of the broadcasting-side time information, the managing unit 108 reads out the broadcasting-side time information held in the broadcasting-side time information holding unit 103 via the broadcasting data importing unit 109, then further reads out the reproducing-side time information held in the reproducing-side time information holding unit 111, and makes a comparison between the broadcasting-side time information and the reproducing-side time information. If the result of the comparison shows the difference between the broadcasting-side time information and the reproducing-side time information, the managing unit 108 gives an instruction to the reproducing-side time information holding unit 111 to correct the time of the reproducing apparatus to be the same as the time of the broadcasting apparatus. Then the managing unit 108 further calculates an error in the frequency of the decoding standard clock against the frequency of the encoding standard clock, and calculates an amount of correction for correcting the decoding standard clock closer to the encoding standard clock from the error, and notifies the amount of correction to the variable frequency generating unit 110.

The broadcasting data importing unit 109 imports the broadcasting data held in the receiving apparatus 106 in an order. In addition, the broadcasting data importing unit 109 imports the broadcasting-side time information and such via bus.

The variable frequency generating unit 110 changes and corrects the oscillation frequency according to the amount of correction notified by the managing unit 108.

The reproducing-side time information holding unit 111 generates the reproducing-side time by clocking based on the frequency which is outputted from the variable frequency generating unit 110. In addition, the reproducing-side time information holding unit 111 holds the reproducing-side time with timing when a notification from the status change signal receiving unit 107 is received. The reproducing-side time information holding unit 111 also corrects the reproducing-side time to be the same with the broadcasting-side time according to the instruction of the managing unit 108.

[Operation]

Figure 3:
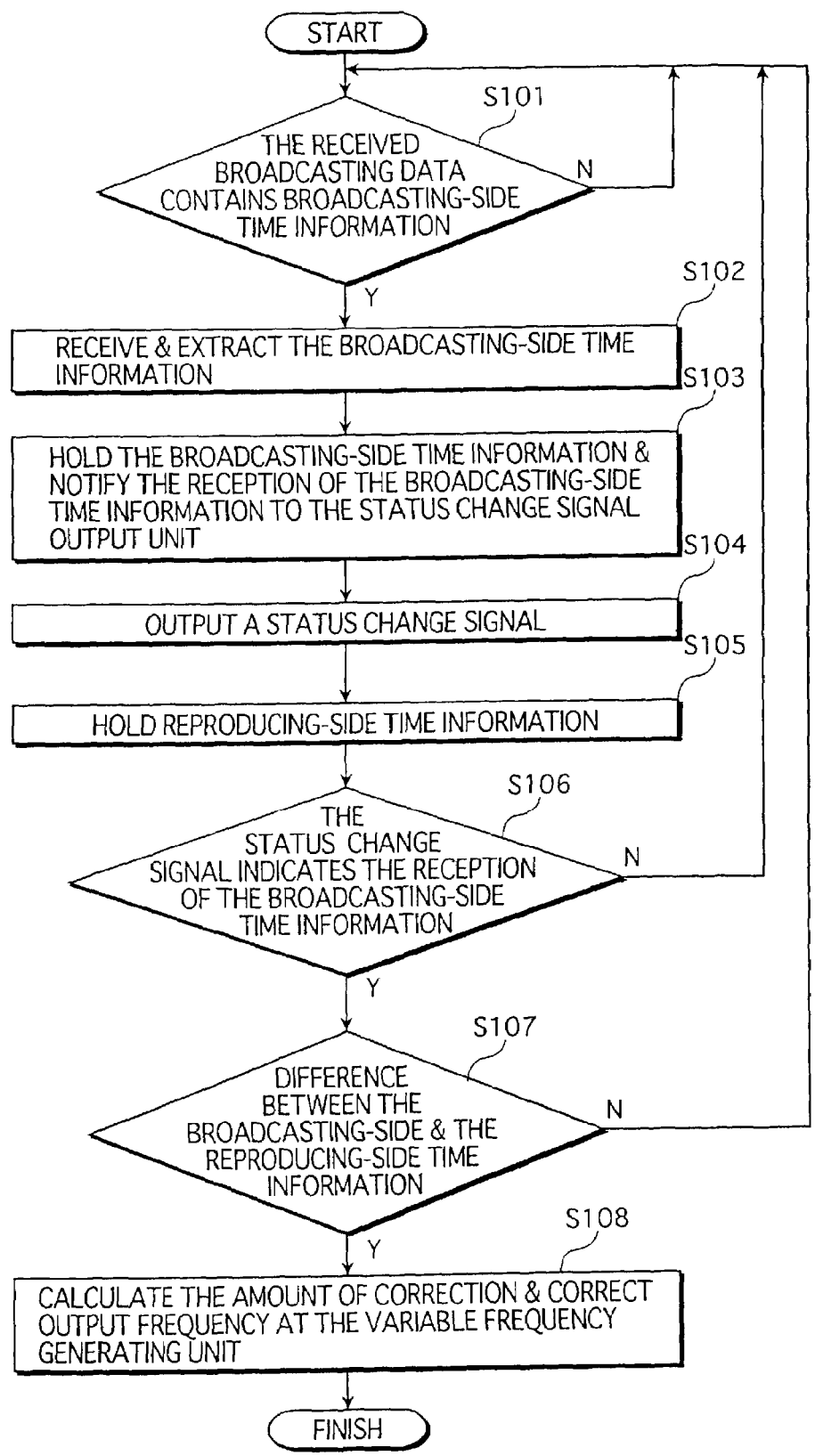
FIG. 3 shows an operational sequence of the receiving apparatus and the reproducing apparatus according to the first embodiment of the present invention.

Next, an operation of the receiving apparatus 106 and the reproducing apparatus 112 with such constructions is explained below. FIG. 3 shows the operational sequence of the receiving apparatus 106 and the reproducing apparatus 112 according to the first embodiment of the present invention.

The broadcasting-side time information extracting unit 102 judges whether the received broadcasting data contains the broadcasting-side time information (S101). If the broadcasting-side time information (an encoded data of the time of the broadcasting apparatus, 12:34:50'11", for example) is contained (S101:Y), the broadcasting-side time information extracting unit 102 extracts the broadcasting-side time information (S102).

The broadcasting-side time information holding unit 103 holds the broadcasting-side time information, and the broadcasting-side time information extracting unit 102 notifies the status change signal output unit 104 that the broadcasting-side time information is received (S103).

Then, the status change signal output unit 104 outputs the status change signal to the status change signal receiving unit 107 via the dedicated line (S104).

The status change signal receiving unit 107 immediately notifies the managing unit 108 and the reproducing-side time information holding unit 111 that the status change signal receiving unit 107 received the status change signal, and the reproducing-side time information holding unit 111 holds the reproducing-side time information (an encoded data of the time of the reproducing apparatus, 12:34:50'10", for example) (S105).

Upon the notification from the status change signal receiving unit 107, the managing unit 108 makes inquiries to the status change signal output unit 104 about what kind of status change occurred in the receiving apparatus 106 (S106). When the result of the inquiry indicates the reception of the broadcasting-side time information (S106:Y), the managing unit 108 reads out the broadcasting-side time information and the reproducing-side time information and judges whether there is any difference between the broadcasting-side time information and the reproducing-side time information (S107).

At S107, if there is any difference between the broadcasting-side time information and the reproducing-side time information (S107:Y), the managing unit 108 gives the reproducing-side time information holding unit 111 an instruction to correct the time of the reproducing apparatus to be identical with the time of the broadcasting apparatus (correct the time of the reproducing apparatus to 12:34:50'11"). Further, the managing unit 108 calculates the interval between previous correction (at 12:34:50'00", for example) and current correction (at 12:34:50'10") (the interval of the example is 0.1 second). Since the difference between the broadcasting-side time information and the reproducing-side time information (0.01 second in the example) is generated during the interval, the managing unit 108 calculates an error (0.01 second to 0.1 second, i.e. 10%) between the frequency of the encoding standard clock (27 MHz in the MPEG-2 TS standard) and the frequency of the decoding standard clock, and corrects the oscillation frequency at the variable frequency generating unit 110 according to the error (S108).

As has been described, according to the receiving apparatus 106 and the reproducing apparatus 112 of the first embodiment, the reception of the broadcasting-side time information is transmitted as the status change signal from the receiving apparatus to the reproducing apparatus via the dedicated line. Specifically, the timing that the receiving apparatus 106 receives the broadcasting-side time information is transmitted to the reproducing apparatus 112. By using both the timing that the receiving apparatus 106 receives the broadcasting-side time information and the content of the broadcasting-side time information, it is possible to properly correct the frequency of the decoding standard clock to be closer to the frequency of the encoding standard clock.

Second Embodiment

[Outline]

When any given broadcasting-side time information is a first broadcasting-side time information, the other broadcasting-side time information that is received after the first broadcasting-side time information is a second broadcasting-side time information. In the second embodiment according to the present invention, the operation relates to the correction of the decoding standard clock is performed only when a broadcasting-side time difference information, which is a difference between a first broadcasting-side time information and a second broadcasting-side time information, exceeds a predetermined threshold value. As a result, it becomes possible to reduce the number of data transmission from the receiving apparatus to the reproducing apparatus in comparison with the first embodiment.

[Construction]

Figure 4:
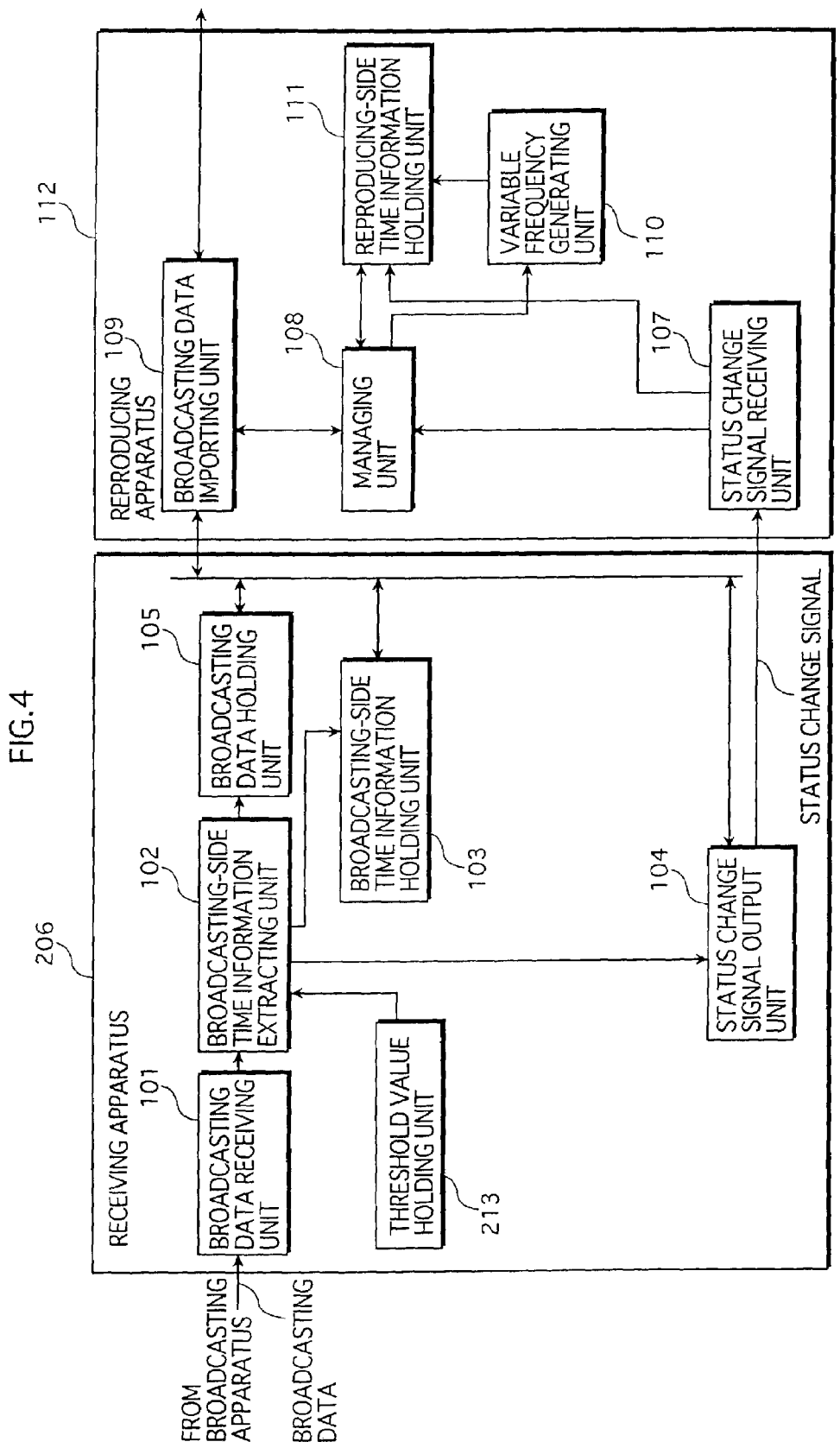
FIG. 4 shows a construction of a receiving apparatus and the reproducing apparatus according to the second embodiment of the present invention.

FIG. 4 shows a construction of a receiving apparatus 206 and a reproducing apparatus 112 according to the second embodiment of the present invention.

The receiving apparatus 206 as shown in FIG. 4 has such a construction in which a threshold value holding unit 213 is included in the receiving apparatus 106 of the first embodiment. The rest of the components of the receiving apparatus 206 excluding the threshold value holding unit 213 are the same as in the receiving apparatus 106 of the first embodiment. Therefore, the same reference numbers are attached to the same components and the explanation is left out for the purpose of simplification.

The threshold value holding unit 213 holds a predetermined threshold value. The threshold value is for being compared with the difference between first and second broadcasting-side time information; the first broadcasting-side time information is received previously, and the second broadcasting-side time information is received currently. An appropriate value is set as the threshold value according to the situation.

The threshold value held by the threshold value holding unit 213 is outputted according to the request from a broadcasting-side time information extracting unit 102.

[Operation]

Figure 5:
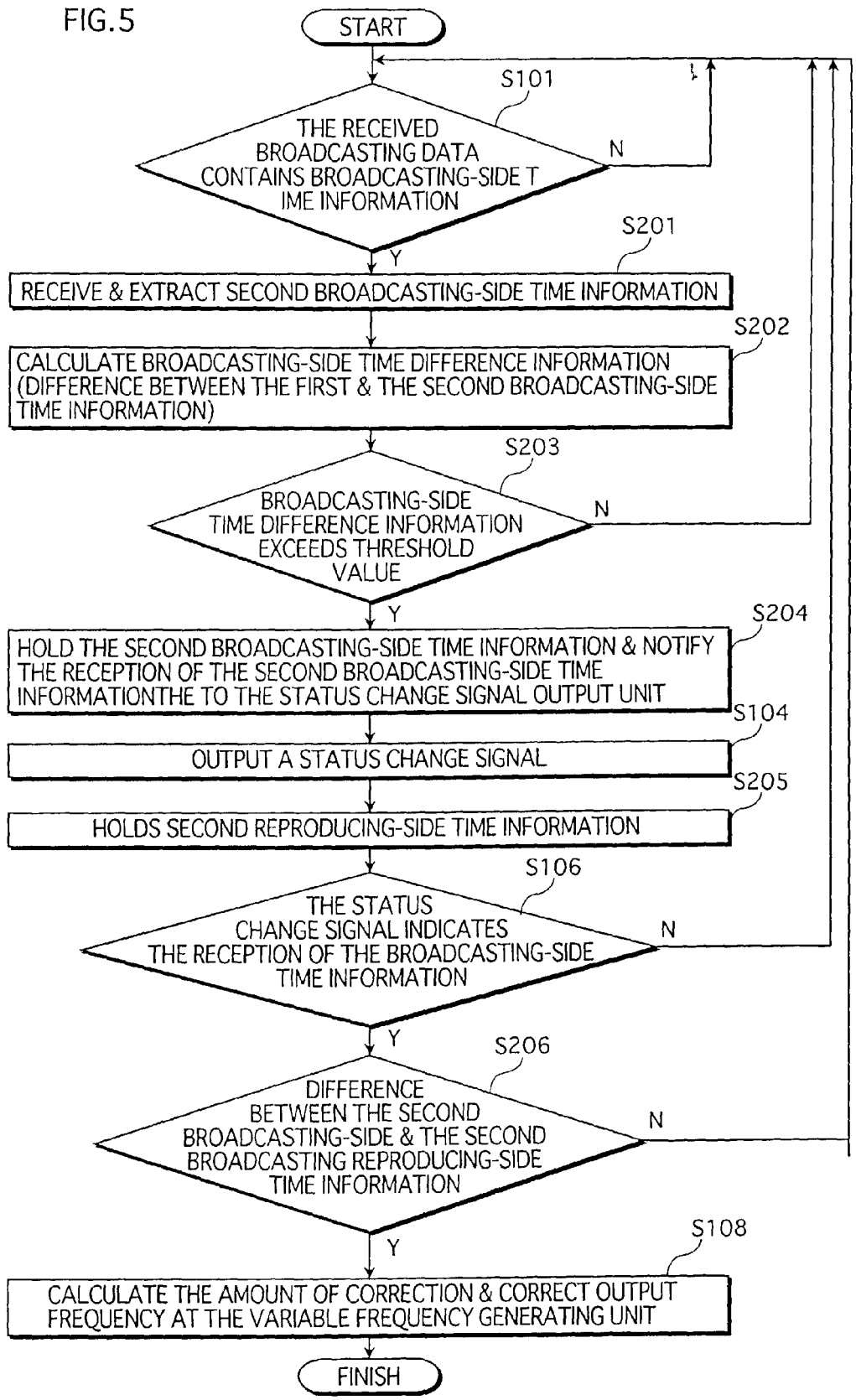
FIG. 5 shows an operational sequence of the receiving apparatus and the reproducing apparatus according to the second embodiment of the present invention.

Next, an operation of the receiving apparatus 206 and the reproducing apparatus 112 with such constructions is explained below. FIG. 5 shows the operational sequence of the receiving apparatus 206 and the reproducing apparatus 112 according to the second embodiment of the present invention.

Here, given that the first broadcasting-side time information is already held in a broadcasting-side time information holding unit 103, for the purpose of the explanation.

A broadcasting-side time information extracting unit 102 judges whether the broadcasting data received contains the second broadcasting-side time information (S101). If the second broadcasting-side time information is contained (S101: Y), the broadcasting-side time information extracting unit 102 extracts the second broadcasting-side time information (S201).

Further, the broadcasting-side time information extracting unit 102 reads out the first time information from the broadcasting-side time information holding unit 103 and calculates the broadcasting-side time difference information which is the difference between the first broadcasting-side time information and the second broadcasting-side time information (S202).

The broadcasting-side time information extracting unit 102 compares the broadcasting-side time difference information and the threshold value which is predetermined and held in the threshold value holding unit 213, and judges whether the broadcasting-side time difference information exceeds the threshold value (S203). If the broadcasting-side time difference information exceeds the threshold value (S203:Y), the broadcasting-side time information extracting unit 102 notifies a status change signal output unit 104 that the second broadcasting-side time information is received, and the broadcasting-side time information extracting unit 102 transmits the second broadcasting-side time information to the broadcasting-side time information holding unit 103 and the second broadcasting-side time information is held thereby (S204).

Then, the status change signal output unit 104 outputs the status change signal to a status change signal receiving unit 107 via the dedicated line (S104).

The status change signal receiving unit 107 immediately notifies a managing unit 108 and a reproducing-side time information holding unit 111 that the status change signal receiving unit 107 received the status change signal, and the reproducing-side time information holding unit 111 holds a second reproducing-side time information (S205).

Upon the notification from the status change signal receiving unit 107, the managing unit 108 makes inquiries to the status change signal output unit 104 about what kind of status change occurred in the receiving apparatus 206 (S106). If the result of the inquiry indicates the reception of the broadcasting-side time information (S106:Y), the managing unit 108 reads out the second broadcasting-side time information and the second reproducing-side time information and judges whether there is any difference between the broadcasting-side time information and the reproducing-side time information (S206).

At S206, if there is any difference between the broadcasting-side time information and the reproducing-side time information (S206:Y), the managing unit 108 gives the reproducing-side time information holding unit 111 an instruction to correct the time of the reproducing apparatus to be identical with the time of the broadcasting apparatus. Further, the managing unit 108 calculates the interval between the previous correction and the current correction. Because the difference between the broadcasting-side time information and the reproducing-side time information is generated during the interval, the managing unit 108 calculates an error between the frequency of the encoding standard clock and the frequency of the decoding standard clock, and corrects the oscillation frequency at the variable frequency generating unit 110 according to the error (S108).

As has been described, according to the receiving apparatus 206 and the reproducing apparatus 112 of the second embodiment, the frequency of the decoding standard clock is corrected to be closer to the frequency of the encoding standard clock only when the broadcasting-side time difference information, which is the difference between the first broadcasting-side time information and the second broadcasting-side time information, exceeds the predetermined threshold value. Accordingly, it becomes possible to reduce the number of data transmission relates to the correction of the decoding standard clock between the receiving apparatus 206 and the reproducing apparatus 112.

Third Embodiment

[Outline]

In the third embodiment of the present invention, the broadcasting-side time difference information is used as the information for correcting the decoding standard clock. The broadcasting-side time difference information is the difference between the first broadcasting-side time information and the second broadcasting-side time information. As a result, it is possible to reduce the size of data transmitted from the receiving apparatus to the reproducing apparatus in comparison with the first embodiment.

[Construction]

Figure 6:
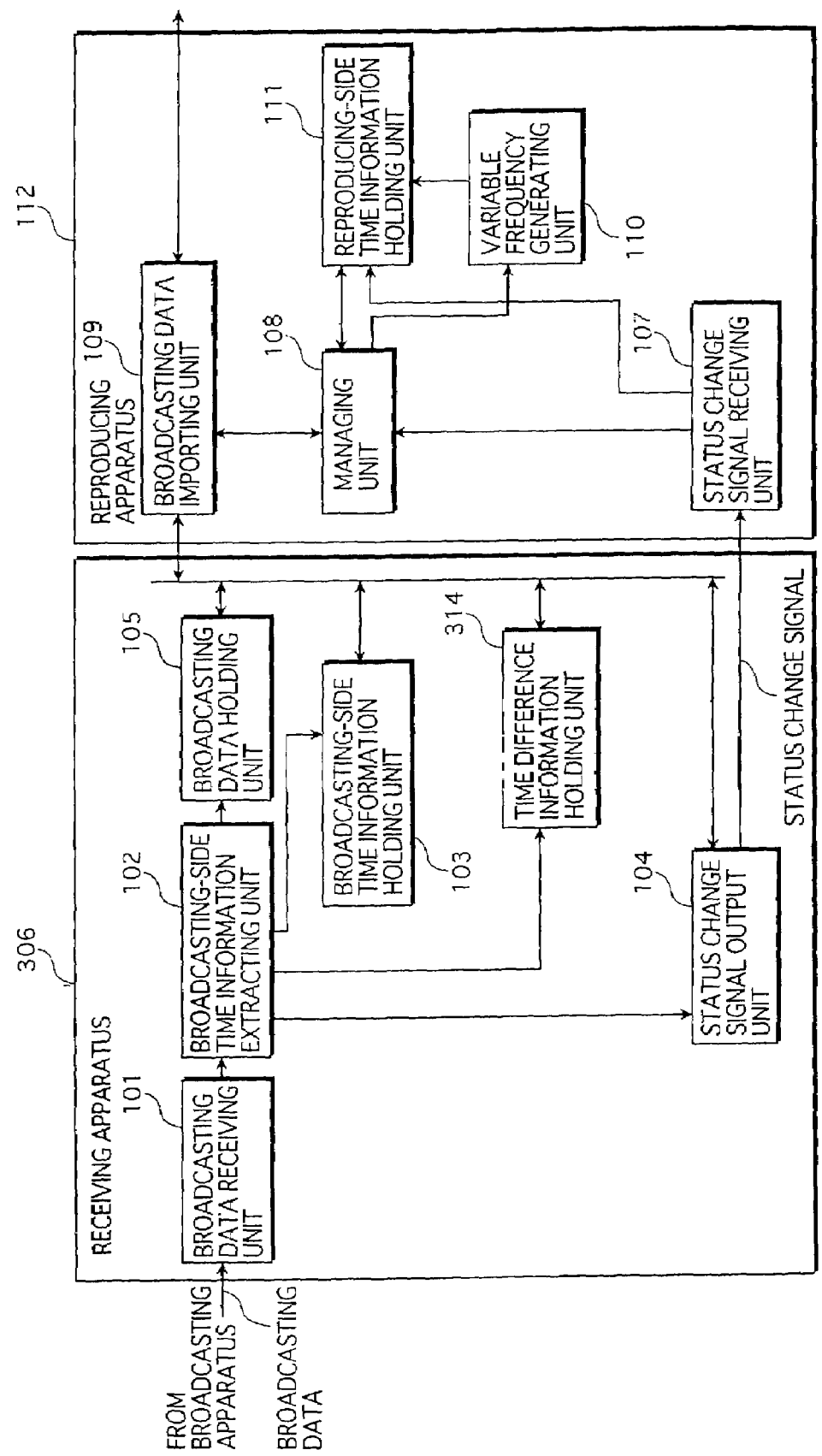
FIG. 6 shows a construction of a receiving apparatus and a reproducing apparatus according to the third embodiment of the present invention.

FIG. 6 shows a construction of a receiving apparatus 306 and a reproducing apparatus 112 according to the third embodiment of the present invention.

The receiving apparatus 306 as shown in FIG. 6 has such a construction that a broadcasting-side time difference information holding unit 314 is included in the receiving apparatus 106 of the first embodiment. The rest of the components of the receiving apparatus 306 excluding the broadcasting-side time difference information holding unit 314 are the same as in the receiving apparatus 106 of the first embodiment. Therefore, the same reference numbers are attached to the same components and the explanation is left out for the purpose of simplification.

The broadcasting-side time difference information holding unit 314 holds the broadcasting-side time difference information which is the difference between the first broadcasting-side time information that are previously received and the second broadcasting-side time information that are currently received. The broadcasting-side time difference information that is held in the time difference information holding unit 314 is outputted according to the request from the reproducing apparatus 112.

[Operation]

Figure 7:
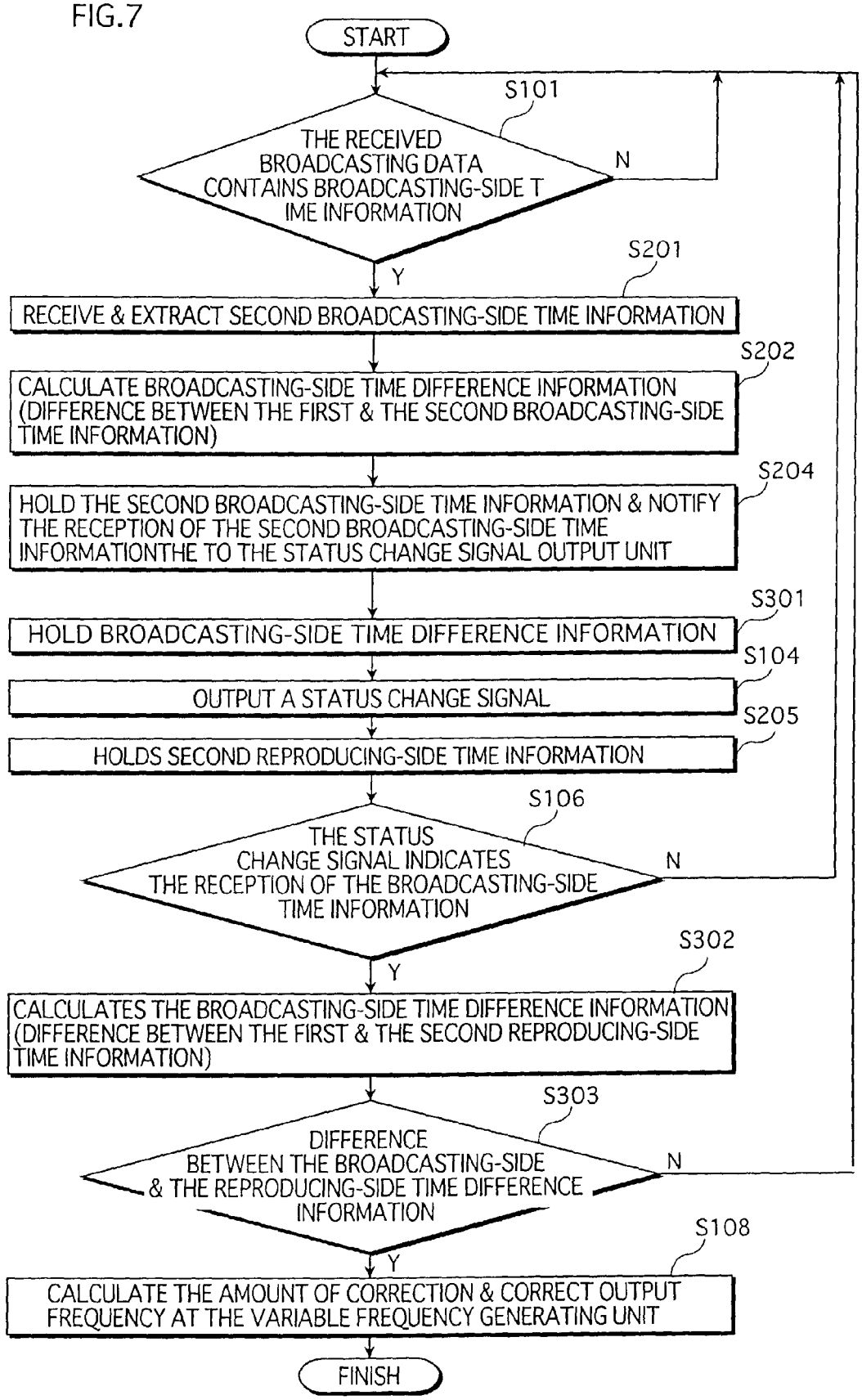
FIG. 7 shows an operational sequence of the receiving apparatus and the reproducing apparatus according to the third embodiment of the present invention.

Next, the operation of the receiving apparatus 306 and the reproducing apparatus 112 with such constructions is explained below. FIG. 7 shows the operational sequence of the receiving apparatus 306 and the reproducing apparatus 112 according to the third embodiment of the present invention.

Here, given that the first broadcasting-side time information is already held in a broadcasting-side time information holding unit 103, for the purpose of the explanation.

A broadcasting-side time information extracting unit 102 judges whether the broadcasting data received contains the second broadcasting-side time information (S101). If the second broadcasting-side time information is contained (S101:Y), the broadcasting-side time information extracting unit 102 extracts the second broadcasting-side time information (S201).

Further, the broadcasting-side time information extracting unit 102 reads out the first time information from the broadcasting-side time information holding unit 103 and calculates the broadcasting-side time difference information which is the difference between the first broadcasting-side time information and the second broadcasting-side time information (S202).

The broadcasting-side time information extracting unit 102 notifies a status change signal output unit 104 that the second broadcasting-side time information is received, and the broadcasting-side time information extracting unit 102 transmits the second broadcasting-side time information to the broadcasting-side time information holding unit 103 and the second broadcasting-side time information is held thereby (S204). Further, the broadcasting-side time information extracting unit 102 transmits the broadcasting-side time difference information to the broadcasting-side time difference information holding unit 314 and the broadcasting-side time difference information is held thereby (S301).

Then, the status change signal output unit 104 outputs the status change signal to a status change signal receiving unit 107 via the dedicated line (S104).

The status change signal receiving unit 107 immediately notifies a managing unit 108 and a reproducing-side time information holding unit 111 that the status change signal receiving unit 107 received the status change signal, and the reproducing-side time information holding unit 111 holds a second reproducing-side time information (S205).

Upon the notification from the status change signal receiving unit 107, the managing unit 108 makes inquiries to the status change signal output unit 104 about what kind of status change occurred in the receiving apparatus 306 (S106). When the result of the inquiry indicates the reception of the broadcasting-side time information (S106:Y), the managing unit 108 calculates the broadcasting-side time difference information which is the difference between the first reproducing-side time information and the second reproducing-side time information that are held in the reproducing-side time information holding unit 111 (S302).

Then, the managing unit 108 judges whether there is any difference between the broadcasting-side time difference information and the reproducing-side time difference information (S303). If there is any difference the broadcasting-side time difference information and the broadcasting-side time difference information (S303:Y), the managing unit 108 gives the reproducing-side time information holding unit 111 an instruction to correct the time of the reproducing apparatus to be identical with the time of the broadcasting apparatus. Further, the managing unit 108 calculates the interval between the previous correction and the current correction. Since the difference between the broadcasting-side time information and the reproducing-side time information is generated during the interval, the managing unit 108 calculates an error between the frequency of the encoding standard clock and the frequency of the decoding standard clock, and corrects the oscillation frequency at a variable frequency generating unit 110 according to the error (S108).

As has been described, according to the receiving apparatus 306 and the reproducing apparatus 112 of the third embodiment, the broadcasting-side time difference information, which is the difference between the first broadcasting-side time information and the second broadcasting-side time information, is used as information for correcting the frequency of the decoding standard clock to be closer to the frequency of the encoding standard clock. Accordingly, it becomes possible to reduce the size of data transmission relates to the correction of the decoding standard clock between the receiving apparatus 306 and the reproducing apparatus 112.

Fourth Embodiment

[Outline]

In the fourth embodiment of the present invention, the broadcasting-side time difference information, which is the difference between the first broadcasting-side time information and the second broadcasting-side time information, is used as the information for correcting the decoding standard clock, and at the same time, the operation relates to the correction of the decoding standard clock is performed only when the broadcasting-side time difference information exceeds a predetermined threshold value. As a result, it becomes possible to reduce the number of data transmission from the receiving apparatus to the reproducing apparatus in comparison with the third embodiment.

[Construction]

Figure 8:
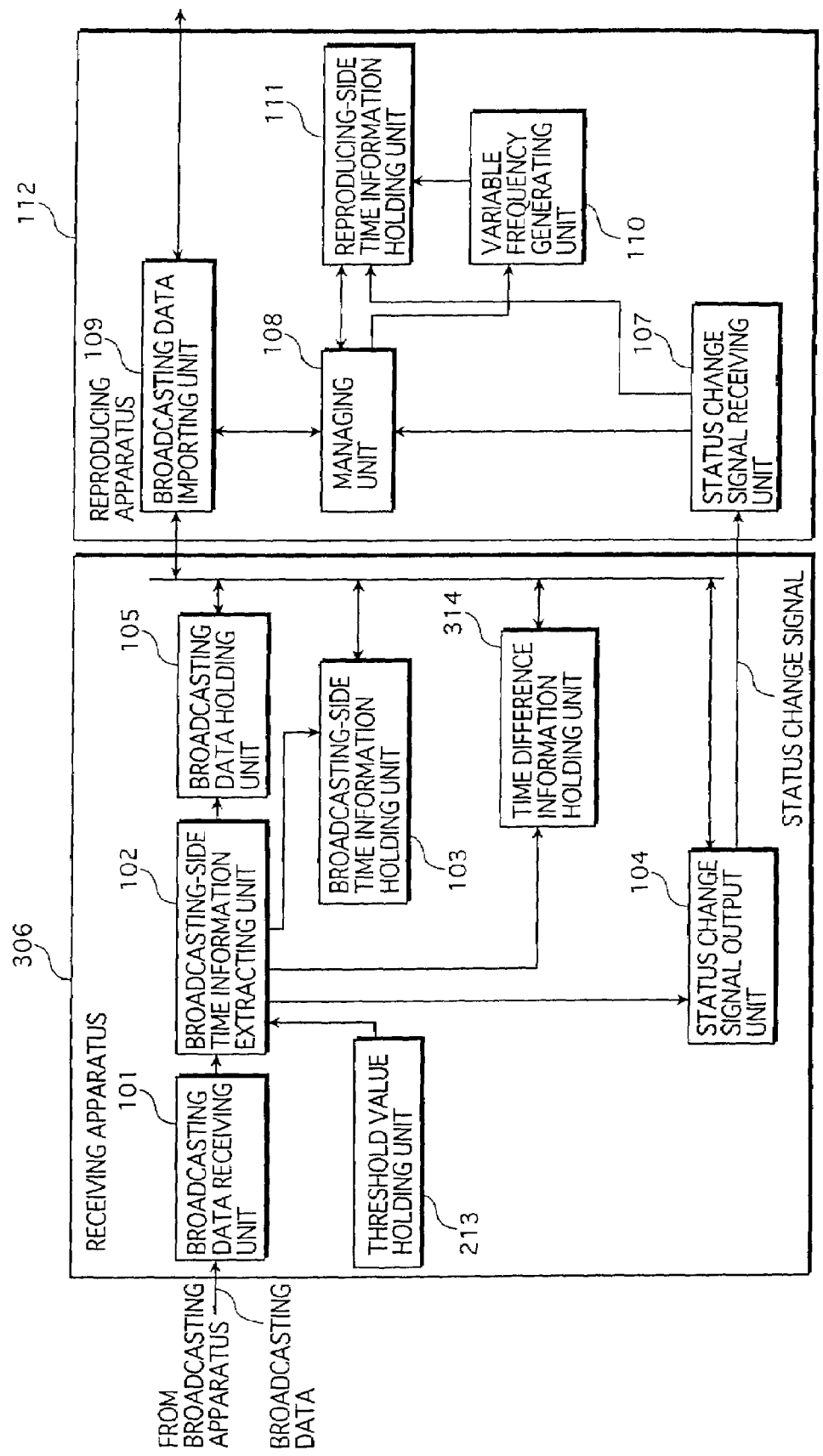
FIG. 8 shows a construction of a receiving apparatus and a reproducing apparatus according to the fourth embodiment of the present invention.

FIG. 8 shows a construction of a receiving apparatus 406 and a reproducing apparatus 112 according to the fourth embodiment of the present invention.

The receiving apparatus 406 as shown in FIG. 8 has such a construction in which a threshold value holding unit 213 is included in the receiving apparatus 306 of the third embodiment. The rest of the components of the receiving apparatus 406 excluding the threshold value holding unit 213 are the same as in the receiving apparatus 306 of the third embodiment. Therefore, the same reference numbers are attached to the same components and the explanation is left out for the purpose of simplification.

The threshold value holding unit 213 is the same with the threshold value holding unit 213 explained in the second embodiment. The threshold value holding unit 213 holds a predetermined threshold value. The threshold value is to be compared with the difference between the first broadcasting-side time information which is received previously and the second broadcasting-side time information which is received currently. An appropriate value is set as the threshold value according to the situation.

The threshold value held by the threshold value holding unit 213 is outputted according to the request from the broadcasting-side time information extracting unit 102.

[Operation]

Figure 9:
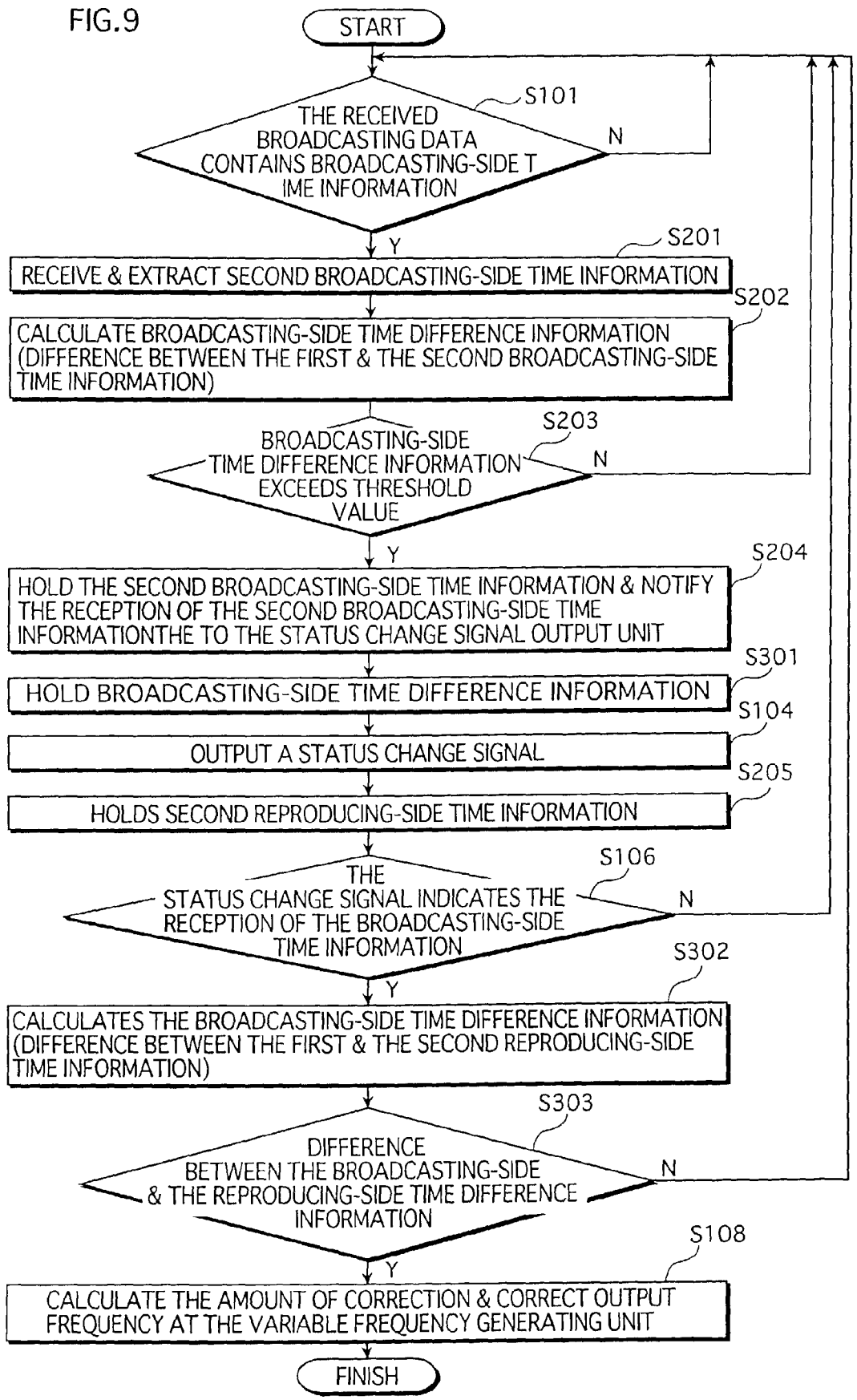
FIG. 9 shows an operational sequence of the receiving apparatus and the reproducing apparatus according to the fourth embodiment of the present invention.

Next, the operation of the receiving apparatus 406 and the reproducing apparatus 112 with such constructions is explained below. FIG. 9 shows the operational sequence of the receiving apparatus 406 and the reproducing apparatus 112 according to the fourth embodiment of the present invention.

Here, given that the first broadcasting-side time information is already held in a broadcasting-side time information holding unit 103, for the purpose of the explanation.

A broadcasting-side time information extracting unit 102 judges whether the broadcasting data received contains the second broadcasting-side time information (S101), and if the second broadcasting-side time information is contained (S101:Y), the broadcasting-side time information extracting unit 102 extracts the second broadcasting-side time information (S201).

Further, the broadcasting-side time information extracting unit 102 reads out the first time information from the broadcasting-side time information holding unit 103 and calculates the broadcasting-side time difference information which is the difference between the first broadcasting-side time information and the second broadcasting-side time information (S202).

The broadcasting-side time information extracting unit 102 compares the broadcasting-side time difference information and the threshold value which is predetermined and held in the threshold value holding unit 213, and judges whether the broadcasting-side time difference information exceeds the threshold value (S203). If the broadcasting-side time difference information exceeds the threshold value (S203:Y), the broadcasting-side time information extracting unit 102 notifies a status change signal output unit 104 that the second broadcasting-side time information is received, and the broadcasting-side time information extracting unit 102 transmits the second broadcasting-side time information to the broadcasting-side time information holding unit 103 and the second broadcasting-side time information is held thereby (S204). Further, the broadcasting-side time information extracting unit 102 transmits the broadcasting-side time difference information to a broadcasting-side time difference information holding unit 314 and the broadcasting-side time difference information is held thereby (S301).

Then, the status change signal output unit 104 outputs the status change signal to a status change signal receiving unit 107 via the dedicated line (S104).

The status change signal receiving unit 107 immediately notifies a managing unit 108 and the reproducing-side time information holding unit 111 that the status change signal receiving unit 107 received the status change signal, and a reproducing-side time information holding unit 111 holds a second reproducing-side time information (S205).

Upon the notification from the status change signal receiving unit 107, the managing unit 108 makes inquiries to the status change signal output unit 104 about what kind of status change occurred in the receiving apparatus 406 (S106). When the result of the inquiry indicates the reception of the broadcasting-side time information (S106:Y), the managing unit 108 calculates the broadcasting-side time difference information which is the difference between the first reproducing-side time information and the second reproducing-side time information that are held in the reproducing-side time information holding unit 111 (S302).

Then, the managing unit 108 judges whether there is any difference between the broadcasting-side time difference information and the broadcasting-side time difference information (S303). If there is any difference the broadcasting-side time difference information and the broadcasting-side time difference information (S303:Y), the managing unit 108 gives the reproducing-side time information holding unit 111 an instruction to correct the time of the reproducing apparatus to be identical with the time of the broadcasting apparatus. Further, the managing unit 108 calculates the interval between the previous correction and the current correction. Since the difference between the broadcasting-side time information and the reproducing-side time information is generated during the interval, the managing unit 108 calculates an error between the frequency of the encoding standard clock and the frequency of the decoding standard clock, and corrects the oscillation frequency at the variable frequency generating unit 110 according to the error (S108).

As has been described, according to the receiving apparatus 406 and the reproducing apparatus 112 of the fourth embodiment, the broadcasting-side time difference information, which is the difference between the first broadcasting-side time information and the second broadcasting-side time information, is used as information for correcting the frequency of the decoding standard clock to be closer to the frequency of the encoding standard clock. Moreover, the frequency of the decoding standard clock is corrected to be closer to the frequency of the encoding standard clock only when the broadcasting-side time difference information exceeds the predetermined threshold value. Accordingly, it becomes possible to reduce both the size and the number of data transmission relates to the correction of the decoding standard clock between the receiving apparatus 406 and the reproducing apparatus 112.

In the first to the fourth embodiments of the present invention, it is explained that the timing of the reception of the broadcasting-side time information is transmitted via the dedicated line. However, it is not limited to the dedicated line if the timing can be transmitted to the reproducing apparatus always in substantially constant length of time. For example, the timing can be transmitted using a part of bus. This is explained more specifically in reference with FIG. 10.

Figure 10:
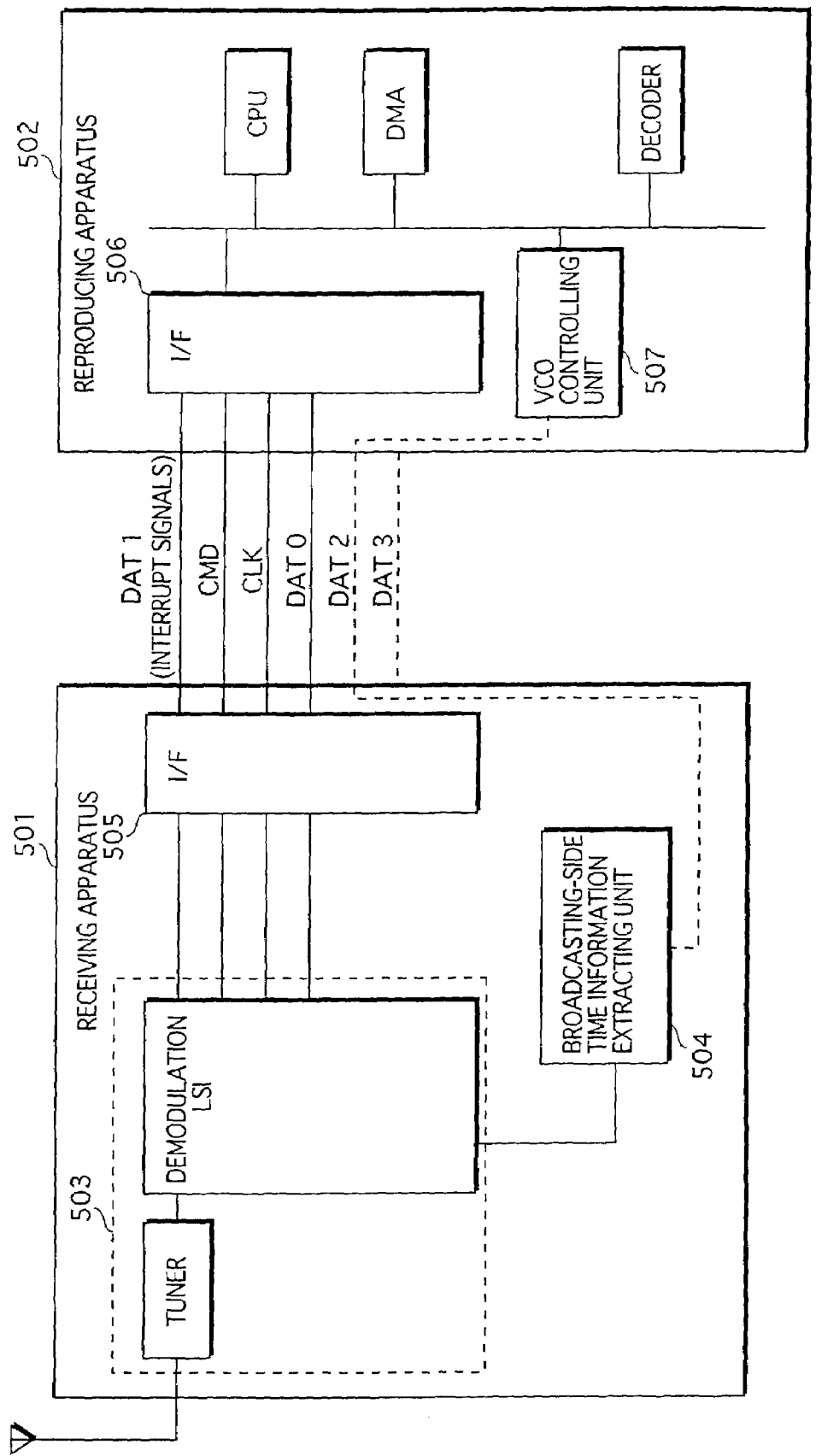
FIG. 10 shows a construction of the receiving apparatus and the reproducing apparatus.

FIG. 10 shows a construction of a receiving apparatus and a reproducing apparatus according to the present invention.

A receiving apparatus 501 is a functionality expansion card with a function for receiving the digital broadcasting. The receiving apparatus 501 comprises a front-end unit 503, broadcasting-side time information extracting unit 504, and an interface unit 505.

A reproducing apparatus 502 is a portable terminal such as mobile phones and PDAs to which the functionality expansion card can be connected. The reproducing apparatus 502 comprises an interface unit 506, a VCO controlling unit 507, a CPU, a DMA controller, a decoder and such.

The front-end unit 503, comprising a tuner and a demodulation LSI, demodulates the broadcast wave and outputs the broadcasting data to the broadcasting-side time information extracting unit 504 and to the interface units 505.

The broadcasting-side time information extracting unit 504 is for extracting the time information in the broadcasting data, and has the same function with the broadcasting-side time information extracting unit 102 in FIG. 2.

The interface units 505 and 506 handle the communication between the functionality expansion card and the portable terminal such as mobile phones and PDAs.

The VCO controlling unit 507 is for correcting the time contained in the reproducing apparatus 502, and has the same functions with the managing unit 108, the variable frequency generating unit 110, and the reproducing-side time information holding unit 111 in FIG. 2.

The communication between the receiving apparatus 501 and the reproducing apparatus 502 is established by connecting between the interface units 505 and 506. Connecting lines include, as shown in FIG. 10, a CMD as a control signal line, a CLK as a clock signal line, and DAT0-DAT3 as data lines. The broadcasting data is transmitted via DAT0-DAT3. The four data lines can be used in parallel when high data transfer rate is required. When the data transfer rate can be low, it is also possible to use only one line and to leave the rest of the lines unused, and the rest of the data lines can be used for other purposes when only one data line is used for broadcasting data transmission. In FIG. 10, the broadcasting data is transmitted via the DAT0, interrupt signals are transmitted via the DAT1, and the timing that the broadcasting-side time information is detected is transmitted via the DAT2. As has been explained above, in the receiving apparatus 501, the timing that the broadcasting-side time information is detected can also be transmitted to the reproducing apparatus 502 using a part of bus.

Moreover, the reproducing apparatus 502, being a portable terminal such as mobile phones and PDAs, is provided with an antenna thereto. Accordingly, another example is considered to be possible that the broadcasting data is received by using the existing antenna.

Figure 11:
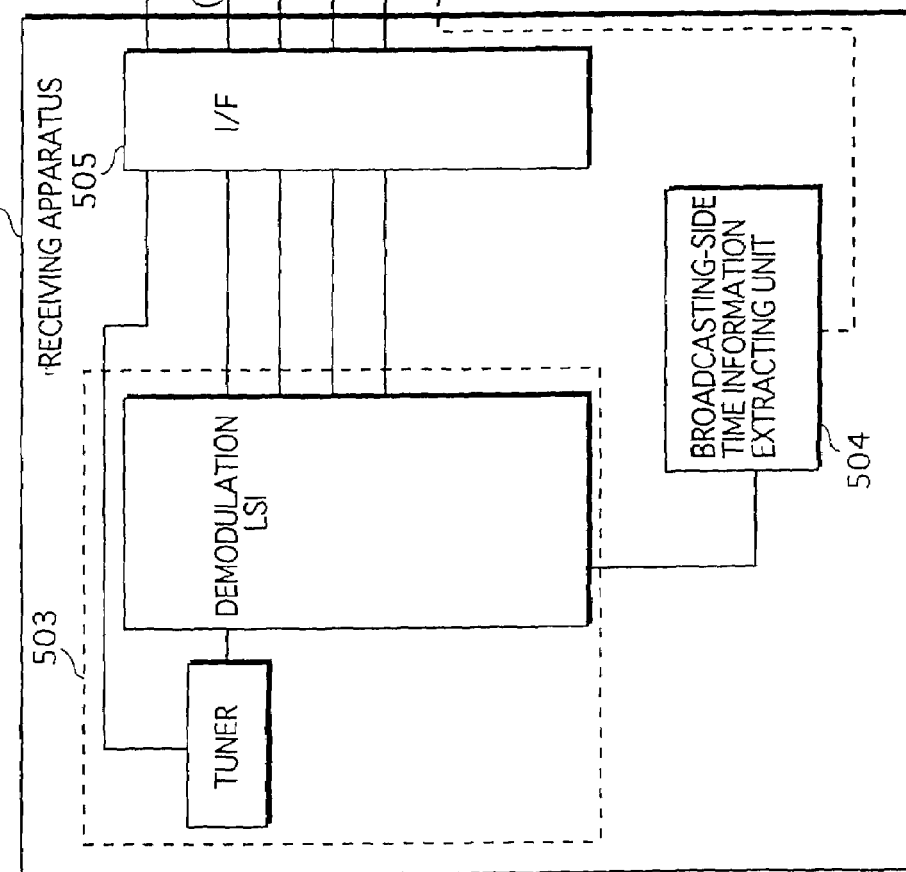
FIG. 11 shows a construction of the receiving apparatus and the reproducing apparatus.

FIG. 11 shows a construction of the receiving apparatus and the reproducing apparatus of such an example.

This example can be achieved in a manner that the broadcasting data is received with the existing antenna of the reproducing apparatus 502, and then, inputted to the tuner of the front-end unit 503 via the interface units 506 and 505.

By using the existing antenna as shown above, it becomes unnecessary to provide a new antenna for receiving the broadcasting data.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method for correcting a frequency used in a system including a broadcasting apparatus, a receiving apparatus and a reproducing apparatus, the broadcasting apparatus generating a plurality of pieces of broadcasting data by encoding content based on an encoding standard clock, and broadcasting the plurality of the pieces of broadcasting data, the receiving apparatus receiving the plurality of the pieces of broadcasting data in an order, and the reproducing apparatus receiving the plurality of the pieces of broadcasting data from the receiving apparatus via a first path, decoding the plurality of the pieces of broadcasting data based on a decoding standard clock, and for reproducing the content, the method comprising:

a time information broadcasting step for broadcasting broadcasting-side time information, the broadcasting-side time information indicating broadcasting-side time measured in accordance with the encoding standard clock and being contained in at least one of the pieces of broadcasting data;

a judging step for judging whether the broadcasting-side time information is contained in the broadcasting data received by the receiving apparatus;

a transmitting step including a first transmitting substep for transmitting a status change signal from a status change signal output unit in the receiving apparatus to a status change signal receiving unit in the reproducing apparatus via a second path different from the first path immediately after a result in the judging step is affirmative, the status change signal indicating timing that the affirmative result was returned in the judging step and at least one of a plurality of status changes occurred in the receiving apparatus, one of the plurality of status changes being a status that the broadcasting-side time information is contained in the broadcasting data, and a second transmitting substep for transmitting information about a type of status change that occurred in the receiving apparatus to the reproducing apparatus via the first path upon the transmission of the status change signal in the first transmitting substep; and a correcting step for correcting, by using the broadcasting-side time information and reproducing-side time information, a frequency of the decoding standard clock to be closer to a frequency of the encoding standard clock, the broadcasting-side time information being received via the first path, the reproducing-side time information being stored in a reproducing-side time information holding unit in the reproducing apparatus and indicating reproducing-side time measured in accordance with the decoding standard clock when the timing information is received in the status change signal receiving unit in the reproducing apparatus.

2. The method for correcting frequency according to claim 1, wherein, the correcting step is the step in which the frequency of the decoding standard clock is corrected, only when the information about the status change indicates that the broadcasting-side time information was contained in the broadcasting data.

3. The method for correcting frequency according to claim 1, wherein the second path connects the receiving apparatus with the reproducing apparatus.

4. The method for correcting frequency according to claim 1, wherein a period necessary for transmission via the first path is uncertain, and period necessary for transmission via the second path is constant.

5. A receiving apparatus for receiving a plurality of pieces of broadcasting data in order from a broadcasting apparatus, and transmitting the received pieces of broadcasting data to a reproducing apparatus via a first path, the pieces of broadcasting data being generated by encoding content based on an encoding standard clock, the reproducing apparatus decoding the received broadcasting data based on a decoding standard clock and reproducing the content, the receiving apparatus comprising:

a judging unit configured to judge whether the received broadcasting data contains broadcasting-side time information, the broadcasting-side time information indicating broadcasting-side time measured in accordance with the encoding standard clock, the broadcasting-side time information being contained in at least one of the pieces of broadcasting data and broadcasted by the broadcasting apparatus;

a transmitting unit configured to transmit information about a type of status change that occurred in the receiving apparatus to the reproducing apparatus via the first path; and a status change signal output unit configured to transmit a status change signal to a status change signal receiving unit in the reproducing apparatus via a second path different from the first path immediately after the judging unit judged affirmative, the status change signal indicating timing that the judging unit judged affirmative and at least one of a plurality of status changes occurred in the receiving apparatus, wherein one of the plurality of status changes is a status that the broadcasting-side time information is contained in the broadcasting data, and the reproducing apparatus corrects the frequency based on the status change signal and reproducing-side time information held in a reproducing-side time information holding unit in the reproducing apparatus.

6. The receiving apparatus according to claim 5 wherein the status change signal output unit transmits first timing information and second timing information to the reproducing apparatus via the second path, the first timing information indicating timing that the judging unit judged affirmative, and the second timing information indicating timing that the judging unit judged that second broadcasting-side time information was contained in the broadcasting data; and wherein the receiving apparatus further comprises:

a time difference transmitting unit configured to transmit time difference information, instead of the broadcasting-side time information, to the reproducing apparatus via the first path, the time difference information showing the difference between the first broadcasting-side time information and the second broadcasting-side time information, and the reproducing apparatus correcting the frequency based on the time difference information.

7. The receiving apparatus according to claim 5 wherein the transmitting unit further comprises:

a threshold value holding unit configured to hold a predetermined threshold value;

wherein the status change signal output unit transmits, immediately after the judging unit judged affirmative, the status change signal to the reproducing apparatus via the second path only if time difference information exceeds the predetermined threshold value, the time difference information being the difference between the first and the second broadcasting-side time information.

8. The receiving apparatus of claim 5 includes a mobile phone with a display for displaying digital broadcasting data and a decoder wherein the status change signal output unit transmits the status change signal to the decoder for correcting the frequency for decoding the broadcasting data.

9. A receiving apparatus of claim 5 where broadcasting-side time information is sent to the reproducing apparatus via the first path and a status change signal is sent to the reproducing apparatus via the second path, wherein the second path is a dedicated connection used only for indicating the reception of broadcasting-side time information to the reproducing apparatus.

10. A reproducing apparatus for receiving a plurality of pieces of broadcasting data from a receiving apparatus via a first path, decoding the pieces of broadcasting data based on a decoding standard clock, and reproducing content, the pieces of broadcasting data being generated by encoding the content based on an encoding standard clock and received by the receiving apparatus in an order;

the reproducing apparatus comprising:
a status change signal receiving unit configured to detect and obtain a status change signal via a second path different from the first path if the receiving apparatus judged the broadcasting data contained broadcasting-side time information, the status change signal indicating timing that the receiving apparatus judged affirmative, at least one of the pieces of broadcasting data being broadcasted containing the broadcasting-side time information, and indicating at least one of a plurality of status changes occurred in the receiving apparatus, one of the plurality of status changes being a status that the broadcasting-side time information is contained in the broadcasting data;
a confirming unit configured to confirm via the first path, a type of status change that occurred in the receiving apparatus when the status change signal is detected;
an obtaining unit configured to obtain the broadcasting-side time information indicating broadcasting-side time measured in accordance with the encoding standard clock;
a reproducing-side time information holding unit configured to store reproducing-side time information indicating reproducing-side time measured in accordance with the decoding standard clock when the timing information is received by the status change signal receiving unit; and
a correcting unit configured to correct, by using the broadcasting-side time information and the reproducing-side time information, a frequency of the decoding standard clock to be closer to a frequency of the encoding standard clock, the broadcasting-side time information being received via the first path.

11. The reproducing apparatus according to claim 10 wherein the correcting unit corrects the frequency of the decoding standard clock, only when the confirming unit confirmed that the status change signal indicated that the broadcasting-side time information was contained in the broadcasting data.

12. The reproducing apparatus according to claim 10 wherein the obtaining unit obtains first timing information and second timing information the first timing information indicating timing that the receiving apparatus judged that first broadcasting-side time information was contained in the broadcasting data, and the second timing information indicating timing that the receiving apparatus judged that second broadcasting-side time information was contained in the broadcasting data; and
wherein the correcting unit receives time difference information instead of the broadcasting-side time information, and corrects the frequency of the decoding standard clock using the first and the second timing information and the time difference information, the time difference information being the difference between the first and the second broadcasting-side time information received by the receiving apparatus.

13. A reproducing apparatus according to claim 10 including a means for correcting the decoding standard clock within the reproducing apparatus by receiving broadcasting data via the first path and a status change signal via the second path, where the status change signal indicates whether the broadcasting data includes broadcasting-side time information, and if so, triggering the immediate storing for the reproducing-side time information to compare with the broadcasting-side time information when the broadcasting-side time information arrives to the reproducing unit via the first path.

14. A reproducing apparatus according to claim 10 includes a broadcasting data importing unit to receive broadcasting data from a receiving apparatus via the first path, a managing unit to compare broadcasting-side time information received from the receiving apparatus via the first path to the reproducing-side time information held in the reproducing-side time information holding unit in the reproduction apparatus, and a variable frequency generating unit used to change the frequency of the decoding standard clock located in the receiving apparatus closer to that of the encoding standard clock located in a broadcasting apparatus based on instruction from the managing unit.

15. A reproducing apparatus of claim 10 where broadcasting data is received via the first path and a status change signal indicating whether the broadcasting data contains broadcasting-side time information is received via the second path, wherein the second path is a dedicated communication between the receiving apparatus and reproducing apparatus.

16. A reproducing apparatus according to claim 10 wherein the reproducing apparatus receives broadcasting data via the first path and a status change signal via the second path, where, if the status change signal indicates that the broadcasting data contains broadcasting-side time information, the reproducing-side time information holding unit within the reproducing apparatus holds the reproducing-side time information, the broadcasting-side time information is read out by a managing unit that compares the broadcasting-side time information received via the first path with the reproducing-side time information contained in the reproducing-side time information holding unit, and the managing unit sends an instruction to the reproducing-side time information holding unit to correct the time of the reproducing apparatus to be the same as the time of the broadcasting apparatus and sending an instruction to a variable frequency generating unit within the reproducing apparatus to correct frequency if the times of the broadcasting apparatus and reproducing apparatus are different.

17. A computer readable medium encoded with computer executable instructions that when executed by a computer results in an operation in which a reproducing apparatus receives a plurality of pieces of broadcasting data from a receiving apparatus via a first path, decodes the pieces of broadcasting data based on a decoding standard clock, and reproduces content,
the pieces of broadcasting data being generated by encoding the content based on an encoding standard clock and received by the receiving apparatus in an order;
the instructions comprising:
an obtaining step for obtaining a status change signal including,
a detecting substep for detecting a status change signal at a status change signal receiving unit via a second path different from the first path, if the receiving apparatus judged the broadcasting data contained broadcasting-side time information, the status change signal indicating timing that the receiving apparatus judged affirmative, at least one of the pieces of broadcasting data being broadcasted containing the broadcasting-side time information, and the broadcasting-side time information indicating broadcasting-side time measured in accordance with the encoding standard clock, the status change signal also indicating at least one of a plurality of status changes occurred in the receiving apparatus, one of the plurality of status changes being a status that the broadcasting-side time information is contained in the broadcasting data, and a confirming substep for confirming via the first path, a type of status change that occurred in the receiving apparatus when the status change signal is detected in the detecting substep; and a storing step for storing reproducing-side time information indicating reproducing-side time measured in accordance with the decoding standard clock when the timing information is received in the reproducing apparatus; and a correcting step for correcting, by using the broadcasting-side time information and the reproducing-side time information, a frequency of the decoding standard clock to be closer to a frequency of the encoding standard clock, the broadcasting-side time information being received via the first path.

18. The computer readable medium according to claim 17 wherein the correcting step is for correcting the frequency of the decoding standard clock, only when the status change signal indicates that confirmation is made in the confirming substep that the broadcasting-side time information was contained in the broadcasting data.

19. The computer readable medium according to claim 17 wherein, in the obtaining step, first timing information and second timing information are obtained, the first timing information indicating timing that the receiving apparatus judged that first broadcasting-side time information was contained in the broadcasting data, and the second timing information indicating timing that the receiving apparatus judged that second broadcasting-side time information was contained in the broadcasting data; and in the correcting step, time difference information instead of the broadcasting-side time information is transmitted, and the frequency of the decoding standard clock is corrected using the first and the second timing information and the time difference information, the time difference information being the difference between the first and the second broadcasting-side time information received by the receiving apparatus.

20. A method for correcting a frequency used in a system including a receiving apparatus and a reproducing apparatus which receives information from a broadcasting apparatus, the receiving apparatus receiving broadcasting data from the broadcasting apparatus which is content encoded by the broadcasting apparatus based on an encoding standard clock, the reproducing apparatus decoding the broadcasting data based on a decoding standard clock for reproducing the content, the method comprising:

determining whether broadcasting-side time information is contained in the broadcasting data received by the receiving apparatus, the broadcasting-side time information indicating a broadcasting-side time based on the encoding standard clock;

providing a status change signal indicating to the reproducing apparatus the reception of the broadcasting-side time information when the broadcasting-side time information is determined to have been received and at least one of a plurality of status changes occurred in the receiving apparatus on a dedicated connection used only for indicating the reception of the broadcasting-side time information to the reproducing apparatus, wherein one of the plurality of status changes is a status that the broadcasting-side time information is contained in the broadcasting data, and the status change signal is provided from a status change signal output unit in the receiving apparatus to a status change signal receiving unit in the reproducing apparatus on the dedicated connection separately from the received broadcasting data;

receiving information about a type of status change that occurred in the receiving apparatus on a connection different from the dedicated connection;

storing reproducing-side time information in a reproducing-side time information holding unit when the broadcasting-side time information is indicated as being received;

measuring a reproducing-side time from the reproducing-side time information in accordance with the decoding standard clock when the broadcasting-side time information is indicated as being received; and correcting a frequency of the decoding standard clock using the broadcasting-side time information and the reproducing-side time information.

\* \* \* \* \*

UNITED STATES PATENT AND TRADEMARK OFFICE
CERTIFICATE OF CORRECTION

PATENT NO. : 7,631,339 B2  Page 1 of 1
APPLICATION NO. : 10/293650
DATED : December 8, 2009
INVENTOR(S) : Ishii et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2073 days.

Signed and Sealed this

Second Day of November, 2010

David J. Kappos
*Director of the United States Patent and Trademark Office*